UNITED STATES PATENT OFFICE 2,237,258

ARTICLE OF MANUFACTURE AND METHOD OF MAKING

Ralph Jacobs, Plainfield, N. J., assignor to Johns-Manville Corporation, New York, N. Y., a corporation of New York No Drawing. Application May 11, 1937, Serial No. 142,073

6 Claims. (Cl. 18—47.5)

This invention relates to an article of manufacture and the method of making the same and, particularly, to an asbestos and cement sheet having a precipitate formed in the face portion thereof.

Asbestos and cement sheets are in wide use as panels for buildings, shingles, sliding units and similar decorative and/or weather facing elements.

It is an object of this invention to precipitate in the surface portion of such an article a compound adapted to establish a desired color or uniformity of appearance. Another object is to make the face of the unit water-repellent. Other objects and advantages will appear as the detailed description progresses.

The invention is useful, for instance, in reducing color differences between adjacent portions of asbestos and cement sheets due to discoloration or other imperfections that develop during manufacture, in improving the general color of the sheet, and/or in minimizing discoloration of asbestos and cement articles during use, as, for instance, by decreasing the penetration of dirty water into asbestos and cement siding units.

The invention comprises the hereinafter described novel features of the method and article of manufacture and, especially, the method of and the product resulting from impregnating asbestos and cement sheets with an aqueous solution of sulphuric acid or an alkali metal soap, so that there is formed a precipitate of calcium sulphate, calcium stearate, or the like in the face portion of the sheets.

The method comprises, in general, forming an intimate mixture including asbestos fibres, Portland cement, and water, shaping and compressing the mixture into a thoroughly consolidated and highly densified sheet, hardening the Portland cement therein, and then impregnating the face of the sheet with an aqueous solution of a substance adapted to form a precipitate with a calcium compound developed during hardening of the Portland cement. Preferably, the mixture which is shaped and compressed contains admixed finely divided silica in proportion (that is, along with the silica present originally in the silicates of the Portland cement) approximately equal theoretically to that required to convert the basic ingredients of the Portland cement to mono-silicates.

For instance, I use to advantage approximately 0.4 to 1.0 part by weight of fine sand or ground quartz, suitably about 0.6 part, to 1 part by weight of Portland cement of average grade. When the admixed silica is used, the hardening is effected by curing in steam at superatmospheric pressure, as, for instance, in substantially saturated steam at approximately 70 to 120 pounds gage pressure.

The proportion of the asbestos fibres, water, and Portland cement to each other, as well as the kind and length of the asbestos fibres, should be about those which are usual in the manufacture of asbestos and cement shingles or siding units. Thus, there may be used chrysotile asbestos fibres in the proportion of the order of 35 to 70, preferably about 50 parts, by weight, to 50 parts of Portland cement. A particular grade of chrysotile asbestos that I have used is one that, in the Quebec standard screening test, shows about 50% retained on the 10-mesh screen and 50% passing therethrough, with practically nothing retained on a 4-mesh screen.

For instance, there is formed an intimate mixture including asbestos, Portland cement, and silica admixed in the proportions stated, the mixture formed into a layer which is wetted with water in excess of the amount required for the hydration of the Portland cement, the layer levelled and lightly compressed, then cut into segments and the segments formed into a stack with alternating metal plates. The stack is then subjected to strong compression, at a maximum pressure of 7,000 to 14,000 pounds to the square inch, the pressure being continued for a minute or so, until practically all the water that may be expressed at the selected maximum pressure has flowed from the sheets.

In making less dense sheets, such as asbestos and cement boards for use as wall panels, the compression is effected at a much lower maximum, say at 1,500 to 3,000 pounds to the square inch.

The apparatus is not illustrated inasmuch as it is conventional in the industry of asbestos and cement products and forms no part of the invention.

The compressed and densified wet sheets are then hardened. This hardening is effected by exposing sheets containing the admixed silica to steam at superatmospheric pressure, as, for instance, at steam pressures referred to above. The steaming is continued for about a day; this duration of steaming allows the temperature to become nearly uniform throughout the entire sheet or stack thereof. The curing is done, suitably, in a closed pressure chamber, so that the atmosphere of the chamber is practically saturated with steam.

When no admixed silica is used, the method described is varied by the omission of the steam curing and substitution therefor of hardening or curing at atmospheric pressure and temperature, suitably in a fog room to decrease evaporation from the edges or exposed parts of the sheets being cured. In such a case the hardening requires usually about one month.

The hardened sheets so made are then given my special treatment to precipitate in the face portion thereof a material to establish color and, preferably, to make the face water-repellent.

For such a purpose, I apply an aqueous solution of ammonium stearate, although for some purposes there may be used a similar solution of another alkali metal soap, such as one consisting chiefly of sodium stearate, palmitate and/or oleate. The soap solution may be of concentration of the order of 3 to 10 parts by weight to 100 of water and, in the case of a sodium soap, may be at an elevated temperature to maintain the soap in solution. If ammonium stearate is the soap used, then the soap solution is, advantageously, not heated but is kept cool in order to avoid loss of ammonia from it.

The concentration of soap should be large enough to react with a large part of the calcium that is available in the treated portion of the unit. It is recommended that the concentrations of soap be in excess of 5% by weight and preferably 10 to 15%.

The soap solution may be applied by dipping the asbestos and cement unit therein or with a brush or spray, and in such quantity as to impregnate the face portion of asbestos and cement unit to an appreciable depth, say, to a depth of 0.004 to 0.020 inch. In general, the depth of penetration should be sufficient to give distribution of the precipitate within the face portion so that the precipitate is not simply a surface scum that may be removed easily. Thus, the penetration may extend, for example, to a depth equal to a tenth to a fiftieth of the total thickness of the unit, or more.

After the application of the solution, the water therein is allowed to evaporate from the shingle, as, for instance, during storage of a multiplicity of the units in spaced relation to each other.

The result of the treatment described is a substantial whitening of the face of the asbestos and cement sheet, with obliteration of stains or other irregularities of color that may have been present originally. Furthermore, there is imparted water-repellence so that a drop of water applied to the treated face will stand thereon for a long time, whereas on a shingle of conventional type, without this treatment, a drop of applied water spreads and is absorbed immediately.

The importance of this water-repellence in shedding dirty water will be readily appreciated.

It is not necessary to the invention to limit it to any theory of explanation of the reactions that occur in the treated face portion of the asbestos and cement sheets. It is considered, however, that the major effect is that due to reaction of the impregnating material, applied in the form of a solution, upon a calcium compound developed during or present in the cured asbestos and cement product. Thus, the reaction may involve to a large extent the lime which is liberated during the hydration of Portland cement and/or an appreciably soluble calcium silicate developed during the steam curing, when the process involves the admixing of finely divided silica followed by steam curing during a later stage of the process. It is probable, also, that the unusual effectiveness of ammonium stearate, as compared to sodium stearate, in whitening the sheet or decreasing the absorption of liquid water thereby, is due to the hydrolysis of some of the ammonium stearate added or of an ammonium silicate formed temporarily during the reaction, in addition to the precipitation of a calcium soap.

As previously pointed out, the present invention is particularly applicable to asbestos cement roofing and siding shingles or units and similar weather facing elements, the term "shingle" being employed hereinafter in a generic sense to include all such shingles and elements.

It will be understood that the details given are for the purpose of illustration, not restriction. Variations within the spirit of the invention are intended to be included in the scope of the appended claims.

What I claim is:

1. A shingle comprising an intimate mixture of asbestos fibres and Portland cement in hardened condition and a calcium soap precipitated in the face portion of the shingle.

2. A shingle comprising an intimate mixture of asbestos fibres and Portland cement in hardened condition and a substantially water-insoluble precipitate in the face portion of the shingle, the said precipitate consisting chiefly of the insoluble reaction product of the mixture and ammonium stearate.

3. A shingle comprising the products of a steam cured intimate mixture of water, asbestos fibres, Portland cement, and admixed finely divided silica, and a substantially water insoluble precipitate in the face portion of the shingle, said precipitate consisting chiefly of the insoluble reaction product of the steam cured product and a water soluble soap.

4. The method of making a shingle which comprises forming an intimate mixture including asbestos fibres, Portland cement, admixed finely divided silica, and water, shaping and strongly compressing the mixture into a sheet, steam curing the compressed mixture, and treating a face portion of the hardened sheet with an aqueous solution of an alkali metal soap.

5. The method of making a shingle which comprises forming an intimate mixture including asbestos fibres, Portland cement, and water, shaping and strongly compressing the mixture into a sheet, hardening the Portland cement therein, and treating a face portion of the hardened sheet with an aqueous solution of ammonium stearate.

6. A construction unit comprising a hardened product, primarily including asbestos fibres, finely divided silica and Portland cement, and a substantially water insoluble precipitate in the face portions of the hardened product, said water insoluble precipitate being composed primarily of the reaction product of a water soluble soap and the hardened product.

RALPH JACOBS.